May 8, 1923.
J. G. JONES
PHOTOGRAPHIC CARTRIDGE
Filed July 25, 1921    2 Sheets-Sheet 2
1,454,812
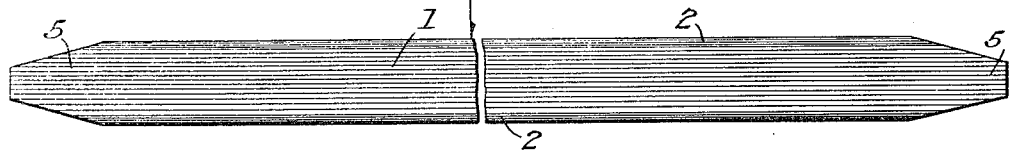
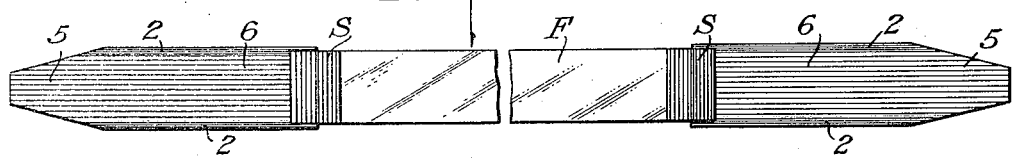
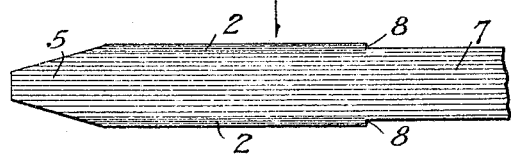
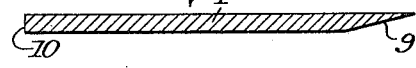
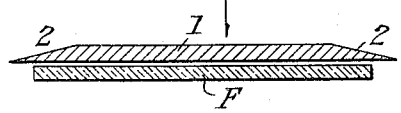
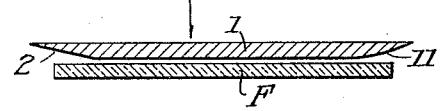
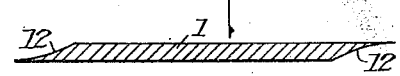
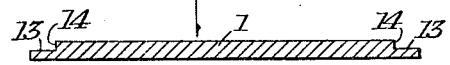
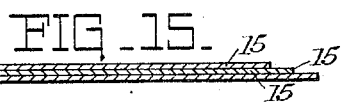
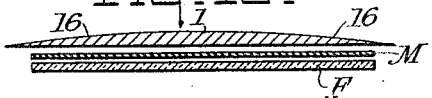
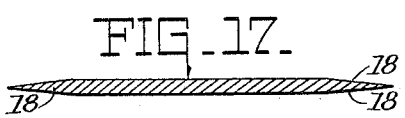
WITNESS
John G. Jones,
INVENTOR
BY
ATTORNEYS.

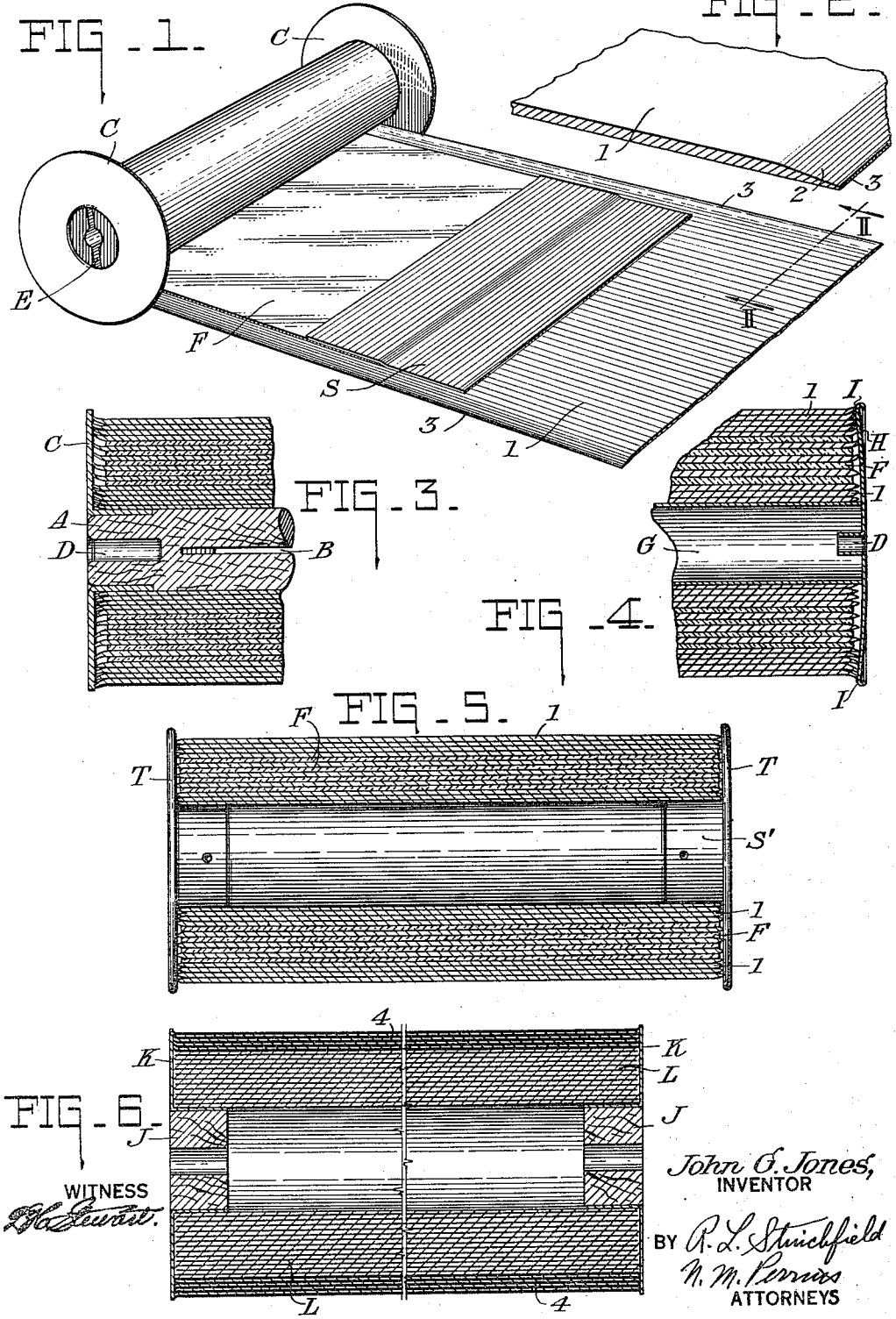

Patented May 8, 1923.

1,454,812

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CARTRIDGE.

Application filed July 25, 1921. Serial No. 487,447.

*To all whom it may concern:*

Be it known that I, JOHN G. JONES, a citizen of the United States of America, residing at Rochester, in the county of Monroe and State of New York, have invented certain new and useful Improvements in Photographic Cartridges, of which the following is a full, clear, and exact specification.

This invention relates to photographic roll film cartridges of the type commonly used in cameras, and comprising a roll of film and protective paper therefor.

While the usual forms of cartridges of this type have been as a rule very satisfactory, there has been an objectionable feature and cause of annoyance that has occasionally arisen. The camera and film are so designed and proportioned that a strip of film of somewhat greater width than the exposure area of the camera passes the field of exposure and there remains after development a clear marginal space along the film. It sometimes happens, however, that light enters the roll of film from the edge and impresses the marginal portions thereof to a greater or less degree, and in extreme cases this may penetrate beyond the portion allowed as a border or margin and encroach upon the picture area. This fault is known as edge fog, and it is particularly objectionable when it is desired to use the margin of the film for light printing inscriptions thereon, as in a certain form of camera, such as that described in patent to Leschbrandt No. 1,284,379, granted Nov. 12, 1918. It is obvious that in order for the light printed legend to be clearly legible upon the border of the film the latter must be free from fog.

The main object of my invention is to provide a cartridge modified in such a way as to obviate this fault without introducing other objectionable features. The type of cartridge in most general use consists of a central core with end flanges upon which is wound the film with its protective paper. This may be a long strip of protective paper to which is attached at the leading end a length of film sufficient for several exposures in an appropriate camera, the paper and film being interwound and the paper extending beyond the film at each end to constitute a safety leader strip. The strip of film may have a lead strip of protective paper attached to each end of it and no backing paper. There are various other types of cartridges, and I contemplate the application of my invention to any type of cartridge in which the sensitive material is wound in a coil and is protected by coiled protective paper.

Various illustrative embodiments of my invention are more fully described and specifically claimed in my co-pending applications Serial Nos. 487,448; 487,449; 487,450; 487,451, and 487,452, all filed July 25, 1921.

In order to overcome the principal causes of edge fog, it is necessary to prevent the accidental unwinding of the protective paper and also to light trap the space between the edges of the film and the inner surfaces of the end flanges. It is further necessary that the protective paper may be rapidly wound upon the spools during manufacture, when this winding is done at a very high rate of speed, and also during use in the camera, when it is desirable that there shall not be undue friction. It is very desirable that allowance shall be made for the expansion and shrinkage of the paper, and that no change shall be made in the cartridge which will unfit it for use in existing cameras, and that the cost of manufacture of the cartridge shall not be increased.

I have discovered that it is possible to modify the protective paper in such a way that it can be used with the existing spools having flat end flanges and at the same time without introducing an objectionable degree of friction or pressure between the protective paper and the flanges during manufacture or under conditions of use. This is done by making the protective paper, particularly the portion constituting the lead strip, so wide that it will at all times contact the inner surfaces of the flanges. It is also desirable that the paper be so modified that it is laterally compressible,—that is, certain portions of it are made so flexible that they will buckle or be compressed when lateral pressure is applied to the edges thereof, and I consider as included within the scope of my invention any means by which the protective band as a whole is rendered thus flexible or laterally compressible.

I have found that this flexibility is best attained by the decreasing of the volume of the margin of the paper. By "margin" I mean a certain width or area along each edge but extending inwardly for a certain distance. It is particularly desirable that this decrease in volume and increase in flexibility, together with the making of the band wider than the distance between the flanges, be present in that portion of the protective paper which extends around and outside of the coiled film constituting usually a safety leader for such film. My preferred method of attaining this decreased volume and increased flexibility is by thinning the marginal portions of the paper as by beveling or chamfering this margin.

It is obvious that numerous modifications embodying the principles above described are possible, and I have described certain of these in the figures of the drawing, to which reference will now be made. Those parts which are the same in the various figures bear the same reference characters in each.

Fig. 1 is a perspective view of a partially unwound film cartridge, the leader strip being broken off;

Fig. 2 is a fragmentary view taken on line 11—11 of Fig. 1 showing an enlarged section of paper;

Fig. 3 is a section of one end of a film cartridge;

Fig. 4 is a section of one end of a different film cartridge;

Figs. 5 and 6 are sections of other forms of film cartridges embodying my invention;

Fig. 7 is a plan of the strip of backing paper only;

Fig. 8 shows a strip of film having leader strips only;

Fig. 9 shows an end of a modified form of backing paper;

Fig. 10 is a section of still another modification of the backing paper;

Figs. 11 and 12 are sections showing two different forms of backing paper with film;

Figs. 13, 14 and 15 are sections of different modified forms of the backing paper;

Fig. 16 is a section showing the different forms of backing paper used with film and with a stencil sheet;

Fig. 17 is a section of still another modified form of backing paper.

It is to be understood that in all of the figures the thickness of the protective paper is very much exaggerated, in order to show more clearly the nature of the invention, and that none of the figures are drawn to scale.

Upon a film spool of ordinary character comprising a wooden core A with the usual central slot B and the metallic end flanges C are interwound a strip of film F and backing paper 1 to which the film is attached by the usual sticker band S. The spool has the customary axial pintle opening D at one end and winding slot E at the other. As thus far described, the cartridge is in every way similar to that in general use. The backing paper 1, however, is cut wider than the distance between the flat interior surfaces of the flanges C, and its edges, during the process of manufacture, are given a tapering or beveled margin which increases in thickness from the extreme edge 3 which is substantially straight, extremely thin and very flexible inwardly until it reaches the full thickness of the backing paper. This may be done by abrading, cutting, skiving, pressing, or any other desired method of manufacture. When the film and paper are thus interwound upon the spool, the marginal portion of the paper will buckle or flex upon itself and thus be crumpled or compressed. Because of its thinness or flexibility, this buckling or compressing will take place with the application of only very slight force and will not cause such friction or resistance as to slow up materially the operation of winding in manufacture, nor will it cause undue resistance to the movement of the film through the camera.

In Fig. 3 is indicated the flexure of the end of the backing paper, but it is to be understood that this is diagrammatic and that I do not limit myself to any particular way in which the paper is compressed. Because of the decreased volume at the margins, the paper will buckle upon itself without such an increase of thickness as to make the ends of the coiled material of objectionably greater diameter than the middle portions thereof,—that is, there is room at the end of each coil of paper for it to fold upon itself without dislodging the next adjacent coil of paper to a material degree.

While the pressure between the protective band and the flange is not so great as to retard the winding, there is a certain slight friction which is enough to prevent the accidental uncoiling of the paper to such an extent as to permit light to reach the film. It is also possible for the paper to expand with moisture, and the expansion is taken up by the edges with their smaller volume without adding objectionable pressure.

Still another feature of importance is present in my structure which is independent of the width between the flanges. Faulty construction of the camera or of the film cartridge sometimes results in the spools at the opposite ends of the camera not being exactly parallel, and it sometimes happens that when the film is wound from one spool to the other one edge of the paper will tend to be forced against one end of the take-up spool and with the ordinary backing paper this may cause binding and in extreme cases the paper becomes so jammed that the spool cannot be turned further without tearing the paper and it becomes necessary to remove the camera back to adjust the film and backing paper, or to remove them before the film has been entirely exposed, resulting in considerable inconvenience and loss.

If the paper is so compressible that it will buckle upon itself I have found that it can be forced against the flanges to a much greater extent than is possible with the ordinary backing paper, and this advantage is inherent in the paper whether or not it is wider than the distance between the flanges. I have shown in Fig. 5 the film and backing paper interwound upon a metal spool S' of ordinary character, the distance between its flanges T being substantially the same as the width of the backing paper.

In Fig. 4 I have shown a metal spool G the flange H of which is cupped or bent inwardly. I do not claim the use of this type of spool in a photographic cartridge as my invention, but I have shown used with such a spool my preferred form of backing paper interwound with film, the backing paper being cut wider than the distance between the cupped portion of the flange I but greater than the distance between the flanges near the core.

In Fig. 6 I have illustrated a form of roll such as is described in patent to Flynn, No. 1,377,154, granted May 3, 1921, having end hubs J and flanges K and having no central core. The flexible sensitive material L is wound upon these hubs in the manner described in the patent mentioned above. After this has been wound thereupon, a band of protective paper 4 is wound around such sensitive material, the width of the band being greater than the distance between the flanges, and the margins of the paper being modified in the way previously described.

In Fig. 7 I have shown a strip of backing paper which I preferably use, consisting, as already stated, of the long sheet 1 having the beveled edges 2 extending its entire length, except for the customary narrowed ends 5. This paper is interwound with the film in the manner described and provides a secure light lock throughout all the coils of the cartridge, and it is, moreover, the simplest form to manufacture.

In Fig. 8 I have shown the film F having leader strips 6 only, the edges of which are beveled at 2 and have narrowed ends 5, as in the preferred form. The film is attached to the leader strip by the customary stickers S and is narrower than the leader strips.

In Fig. 9 I have shown one end of the backing paper which it is to be understood is to be interwound with the film in the same way as the preferred form, but the leader strips only are made with beveled edges 2, the central portion 7 of the backing paper which comes opposite the film being made narrower, as shown, there being slight abutments or shoulders 8 at the inner ends of the lead strips.

If desired, one edge only of the protective paper may be made thinner or beveled, such a modification being shown in Fig. 10, where one edge of the paper is beveled, as shown at 9, the other end being cut abruptly as at 10. When interwound with the film, the beveled edge 2 may either be on the side of the backing paper away from the film, as shown in Fig. 11, or may be on the side toward it, as shown in Fig. 12, and instead of a straight beveled edge a convex bevel may be used, as shown at the right of Fig. 12 at 11. The beveling may be concave, as shown at 12 in Fig. 13, this figure further illustrating one bevel being made from one surface of the paper and the bevel at the opposite margin being from the other surface.

Instead of making the chamfer gradual or beveled, it may be made of uniform thickness, as shown in Fig. 14, where the backing paper is of the full thickness throughout its median portion and has a uniformly thinner margin 13 with a slight shoulder 14 at the inner edge of the margin. If desired, the backing paper may be built up of several bands of thin paper 15 preferably adherent to each other, as shown in Fig. 15, the bands being consecutively narrower, so that the protective strip as a whole has margins which are gradually thicker from the extreme edge inwardly, but made of sections of uniform thickness. The beveling may extend in for a considerable distance, as indicated at 16 on Fig. 16. In this figure also is shown the backing paper used with film F and stencil sheet M, such as is used in a certain type of film cartridge adapted for making inscriptions upon the film. In Fig. 17 the beveling is shown as extending from both surfaces as at 18.

It will be apparent that there is in each case a protective band, usually a lead strip, which is coiled around and is outside of the film, this band having the characteristics mentioned. Furthermore, in all of the forms, as well as numerous others that might be mentioned, the protective paper is made of different flexibility at different points of its width, thus permitting it to be flexed or laterally compressed readily, and that preferably the marginal portions are thinner than the median portion, by which I mean the portion of the band between the margins.

While I do not limit myself to any specified dimensions, I have in practice found that satisfactory results are obtained when the paper is cut from .02" to .05" wider than the distance between the flanges dependent on the size of the cartridge. The width of backing paper cut 3½" wide may vary by about .03" due to atmospheric conditions.

The thickness of the body of the backing paper is usually from .003″ to .005″ and at the extreme edge this would be reduced to from .0015″ to .003″, and the width of the margin affected is preferably from .02″ to .13″. These are, of course, but illustrative examples that have been found satisfactory in use.

It is to be further understood that while the different modified forms that I have described and suggested and others which are their equivalents come within the scope of my invention as claimed, these different forms naturally vary in their practicability and have different peculiar advantages and disadvantages, some being better adapted for manufacture than others and some being more efficient for the described and intended purposes than others. In this application I have particularly shown and claimed that form which has beveled margins extending throughout the length of the backing paper, which I find a particularly desirable form; but it is apparent that this form includes certain characteristics capable of application to other cartridges differing widely from the one specifically claimed, and I contemplate such variations and modifications as within the scope of my invention as hereinafter claimed.

Having thus described my invention, what I claim as new and desire to secure by Letters Patent is:

1. A photographic cartridge comprising coiled strips of sensitized material and of protective material, the margins of the protective strip being more flexible than the median portion thereof.

2. A photographic cartridge comprising strips of sensitized material and of protective material interwound in a spiral coil, the strip of protective material being wider than the strip of sensitized material, and the margins thereof being of less volume and more flexible than the median portion thereof.

3. An article of manufacture comprising a roll of light sensitive material, a support therefor comprising spaced end flanges, and a strip of protective material coiled around said sensitive material and of different lateral compressibility at different portions of its width, the width of the strip being greater than the distance between the flanges.

4. An article of manufacture comprising a roll of light sensitive material, a support therefor comprising spaced end flanges and a strip of protective material coiled around said sensitive material and having at least one margin more flexible than the median portion thereof.

5. An article of manufacture comprising a roll of light sensitive material, a support therefor comprising spaced end flanges, and a strip of protective material coiled around said sensitive material and having at least one margin more flexible than the median portion thereof, the width of the strip being greater than the distance between the flanges.

6. An article of manufacture comprising a roll of light sensitive material, a support therefor comprising spaced end flanges, and strip protective material coiled around said sensitive material, the margins of such strip material being of less volume and more flexible than the median portion thereof; and the width of said strip material being greater than the distance between the flanges.

7. An article of manufacture comprising a spool with end flanges, a band of light sensitive material wound thereon, sheet protective material attached to the film and constituting end strips wound on the spool inside the film and outside thereof, said end strips being of different flexibility at different portions of their width, and said end strips being wider than the distance between the flanges.

8. A photographic roll film cartridge comprising a spool with end flanges, bands of photographic film and of protective material interwound thereon, the band of protective material being longer than the band of film and the ends thereof constituting lead strips, the margins of the band of protective material throughout its length being of less volume than the median portion of such band.

9. A photographic film cartridge comprising a spool with end flanges, bands of photographic film and protective material interwound thereon, said protective material being longer than said film band and the ends thereof constituting end strips wound inside of and outside of said film, the margins of said end strips being of less volume than the median portions thereof, and said end strips being wider than the distance between said flanges.

10. A photographic cartridge comprising bands of photographic film and opaque paper interwound in a spiral coil, the paper band being wider than said film band and the margins of the paper band being thinner than the median portion thereof.

11. An article of manufacture comprising a roll of light sensitive material, a support therefor comprising spaced end flanges, and a strip of protective material rolled around said sensitive material and of different thickness at different points of its width, the width of the strip being greater than the distance between the flanges.

12. An article of manufacture comprising a roll of light sensitive material, a support therefor comprising spaced end flanges, and strip protective material wound around said sensitive material, said protective material being thicker in the median portion thereof that at the margins, and the width of said protective material being greater than the distance between said flanges.

13. An article of manufacture comprising a spool with end flanges, a band of light sensitive material wound thereon, and strip protective material interwound therewith, said strip material being longer than said band and the ends thereof constituting end strips coiled inside and outside of said band, the margins of said end portions being thinner than the median portions thereof and the width of the end strips being greater than the distance between the flanges.

14. A photographic film cartridge comprising a spool with end flanges, bands of light sensitive material and of protective material interwound thereon, the margins of the last named band being thinner than the median portions of said band throughout its length.

15. A photographic film cartridge comprising a spool with end flanges, bands of light sensitive material and of protective material interwound thereon, the margins of the last named band being beveled throughout its length, and said protective band being wider than the distance between the flanges.

16. An article of manufacture comprising a spool with end flanges, a band of light sensitive material wound thereon, and a strip of protective material wound around said sensitive material, the margins of such strip being of gradually increasing thickness inwardly from the extreme edges thereof, and said strip being wider than the distance between the flanges.

17. As an article of manufacture and sale, a photographic roll film cartridge comprising a spool having a core and end flanges, bands of photographic film and of protective paper interwound on the spool, the paper band being longer than the film band and extending beyond it at each end, the outer end of the film band being attached to the paper and the margins of the paper band increasing gradually in thickness inwardly from the extreme edge where they are very thin, flexible and substantially straight, the width of the paper band being greater than the distance between the flanges.

18. A film cartridge comprising a spool having end flanges with facing, flat, rigid surfaces spaced by a determinate distance, a strip of sensitized material and protecting strip material for preventing the passage of actinic light including leader strips and wound with the sensitized strip into a coil, said leader strips being of greater width than the space between the flanges of the spool and adapted to fit tightly against the latter to form a light seal for the sensitized film.

Signed at Rochester, New York, this 21st day of July, 1921.

JOHN G. JONES.